Oct. 5, 1965 W. D. HUSTON 3,210,758
ELECTROMAGNETICALLY OPERATED INDICATOR
Filed June 14, 1962

INVENTOR.
WILLIAM D. HUSTON
BY
ATTORNEY

United States Patent Office 3,210,758
Patented Oct. 5, 1965

3,210,758
ELECTROMAGNETICALLY OPERATED
INDICATOR
William D. Huston, Rochester, N.Y., assignor to American Radiator & Standard Sanitary Corporation, New York, N.Y., a corporation of Delaware
Filed June 14, 1962, Ser. No. 202,520
4 Claims. (Cl. 340—373)

This invention relates to a signal or indicator, and, more particularly, but not necessarily exclusively, to an indicator especially suitable for installation on the instrument panel of an automotive vehicle for signalling generator failure, oil pressure reduction, depletion of the fuel supply, or the like.

Heretofore, it has been common to use incandescent lamps as indicators in vehicles for indicating low voltage in the electrical upply or loss of oil pressure. Lamps, however, are not safe. They are subject to failure due to burn-out or to breaking of their filaments by vibration, and replacement of the bulbs is usually an annoying proposition because of their ordinarily relatively inaccessible location. Relatively expensive damage may result in the event that failure of the incandescent lamps goes unnoticed.

For several reasons, it has not been deemed practicable to use lamps in so-called "fail-safe" arrangements in vehicles, but instead they are almost universally arranged to be deenergized under normal, satisfactory operating conditions, and to be energized only when the conditions become unsatisfactory. Thus, the lamps do not warn of unsatisfactory operating conditions that occur while the lamps themselves are broken or burned out, or while their energizing circuits are faulty.

Accordingly, one important object of the present invention is to provide an indicator responsive to an electrical signal, which is especially suited for "fail-safe" operation, which may be operated on a normally energized basis, and which provides a readily noticeable indication of deenergization regardless of cause.

Another object is to provide an indicator especially for use in vehicles, which is not subject to failure due to burn-out, vibration, or the like, and which is reliable in operation and readily visible.

Another object is to provide an indicator of the stated type, which is relatively compact and easily mounted on an instrument panel, yet which is relatively simple and inexpensive to manufacture, and rugged and substantially fail-proof in service.

The following detailed description of the invention and of the presently preferred embodiment thereof should be read in conjunction with the drawing, wherein.

Figure 3:
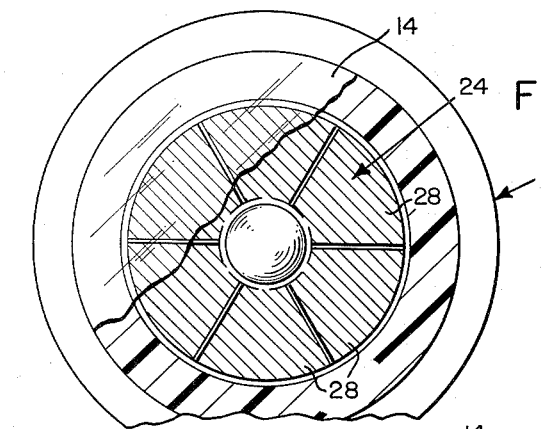
FIG. 3 is a part front elevational view part section of the indicator, showing the blades or vanes of the indicator face in one extreme position.

The indicator blades are cross hatched in FIGS. 1, 3, 4 and 5 to indicate the contrasting colors of the separate parts.

Briefly, the indicator illustrated includes a pair of coaxially mounted, differently colored discs, each one of which is composed of plural blades, or vanes angularly inclined relative to a common plane in the manner of the blades of the common electric fan. The discs are mounted so that the blades of the first disc are normally covered by the blades of the other or second disc; and means responsive to an applied signal are provided for rotating the discs relative to each other through an angle approximately equal to the width of one of the blades, thereby to uncover the blades of the first disc and move the blades of the second disc behind the corresponding adjacent blades of the first disc. The rotation shifts the apparent relative axial positions of the two discs, even though there is no actual axial motion. In one position, only the first disc is visible. In the other extreme position, only the second disc is visible. The blades of the two discs are differently colored so that the entire face of the indicator appears to change color in response to the applied signal.

An electromagnet may be used to produce the desired relative motion between the discs in one direction, and a permanent magnet may be used to produce the opposite, or restoring motion, as in the preferred embodiment described herein, thus taking advantage of the relatively low heat dissipation and low power requirements of the electromagnet for practical normally energized, fail-safe operation. In addition, the display may be made relatively large, and the blades that are visible when the indicator is deenergized may be colored a bright red or orange, or coated wtih a phosphorescent material so that the "fail" or "unsatisfactory" indication is not apt to go unnoticed. The arrangement is also exceedingly compact and only requires a relatively small mounting space in the instrument panel as compared to the size of the display.

Referring now to the drawing by numerals of reference, the indicator shown therein includes a transparent, plastic cylindrical housing 10, which may be conveniently fitted into and secured upon the instrument panel of a vehicle or the like. An integral face portion 14 closes one end of the housing 10, and a first disc 12 is fixed within the housing 10 adjacent to the face 14 thereof. The disc 12 includes an annular outer rim 16, which is seated between a rearwardly facing, internal shoulder 18 of the housing and a spacer ring 20, which fits snugly within the housing 10 behind the rim 16 of the disc. Six angularly arranged and spaced blades 22, integral with the rim 16 extend inwardly therefrom. Each of the blades 22 extends about the axis of the disc 12 through an angle of about 60° and is inclined at an angle of from about 15° to about 20° to the plane of the rim 16 of this disc.

A second disc 24 is mounted concentrically with the first disc 12 upon a hub 26, which is rotatable within an aperture defined by the inner edges of the blades 22 of the first disc. The second disc 24 includes six blades 28, which extend outwardly from the hub 26, and which are disposed similarly to the blades 22 of the first disc, extending through an angle of approximately 60° about the common axis of discs 12 and 24 and being inclined at an angle of from 15° to 20° relative to the plane of the rim 16. The second disc 24 is thus rotatable between a first position, illustrated in FIG. 3, in which its blades 28 lie in front of and conceal the blades 22 of the first disc, and a second position, illustrated in FIG. 5, in which its blades 28 lie behind, and are concealed by the blades 22 of the first disc.

The hub 26 is pivoted on a central stem or stud 30, and carries an annular magnet 32, which is fixed to the hub 30 and is magnetized in a diametrical direction, that is, normal to its axis of rotation. The stem 30 is fixed to a circular mounting plate 36, which fits closely within the housing 10 behind and abutting the spacer ring 20. An auxiliary magnet 38 is riveted, or otherwise secured upon the front surface of the mounting plate 36 adjacent to and laterally offset from the pivoted magnet 32 for biasing the magnet 32, along with the rotatable disc 24 toward a preselected angular position relative to the fixed disc 12. As shown, the auxiliary magnet 38 is positioned to urge the pivoted magnet 32 toward a position in which the blades 28 of the rotatable disc lie in front of and cover the blades 22 of the fixed disc.

An electromagnet 40 is mounted within the housing 10 behind the mounting plate 36 for driving the permanent magnet 32, in response to an applied signal, away from the position to which it is biased by the auxiliary magnet 38 and through an angle of about 60° to the second operative position in which the blades 28 of the pivoted disc 24 lie behind and are concealed by the blades 22 of the rim-mounted, stationary disc 12.

The electromagnet 40 includes a coil 42 and a pair of pole pieces 44 and 46 fixed at the ends of the coil 42 and extending forwardly toward the permanent magnet 32. The coil 42 and the pole pieces 44 and 46 are mounted, as shown, between a pair of insulating plates 48, which fit between the mounting plate 36 and the rear cover 50 of the housing, and which also serve to hold the mounting plate and the spacer ring 20 in position within the housing 10. The electrical leads for the coil 42 are brought out through grommets 52 which extend through the rear cover 50 and connect to connecting lugs 54 exteriorly of the indicator.

Under normal operating conditions, the magnetic attraction between the pivoted permanent magnet 32 and the auxiliary magnet 38 and the pole faces 44 and 46 is fully adequate to retain the hub 26 fully seated upon the stem 30, but preferably, the spacing between the front of the hub 26 and the face 14 of the housing is less than the length of the hub 26, so that in the event of exceptionally severe shock, the hub 26 cannot escape from the stem 30.

In operation in a fail-safe arrangement, as long as the condition being indicated is satisfactory, that is, for instance the temperature in the motor cooling system, the level of fuel in the gasoline tank, or the level of oil in the crankcase, etc., is normal, voltage will be applied across the coil 42 energizing it, and the indicator will appear as shown in FIG. 3, with the blades 28 of the pivoted disc 24 covering the blades 22 of the stationary disc 12. Only the blades 28 of the pivoted disc then are visible. The disc 24 may, for example, be colored green to indicate that all is well as regards generator voltage, oil pressure, fuel level, coolant temperature, or the like. If the generator is not being charged properly, however, or if the oil pressure or fuel level drops dangerously low, or if the temperature in the radiator rises dangerous high, however, the circuit to the electromagnet will be broken. The return magnet will then cause the pivoted permanent magnet 32, along with the disc 24 to be rotated in a counter-clockwise direction as viewed in FIGS. 3, 4, and 5 through an angle approximately equal to the angle of one of the blades 22 and 28 to the position shown in FIG. 4, wherein the blades 28 of the rotatable disc are substantially concealed behind the blades 22 of the fixed disc 12. In this position, only the blades 22 of the fixed disc 12 are visible to the operator of the vehicle. The blades 22 of the fixed disc may, for example, be colored red, and will therefore indicate danger, the existence of an unwanted situation in the condition being indicated.

Figure 4:
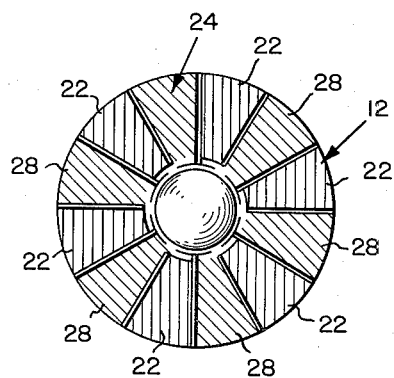
FIG. 4 is a front elevational view of the blades or vanes of the indicator in an intermediate position between their two opposite extreme positions.
Figure 1:
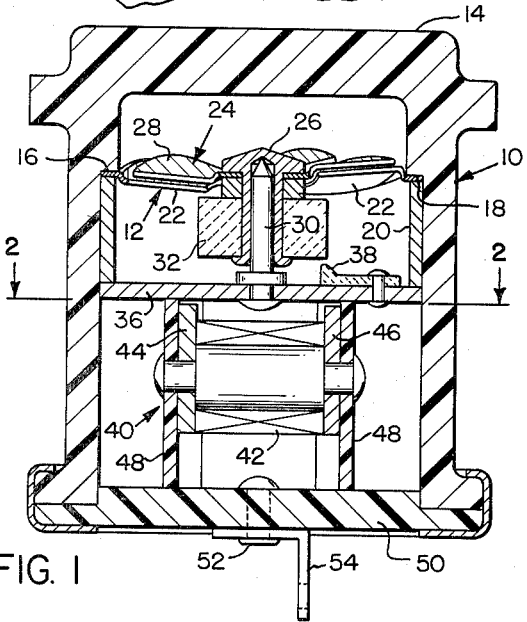
FIG. 1 is a horizontal, sectional view of an indicator constructed according to a presently preferred embodiment of the invention.
Figure 5:
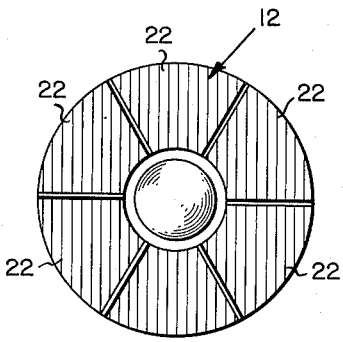
FIG. 5 is a front elevational view of the indicator vanes or blades, showing them in the second, or the opposite extreme position from that of FIG. 3.
Figure 2:
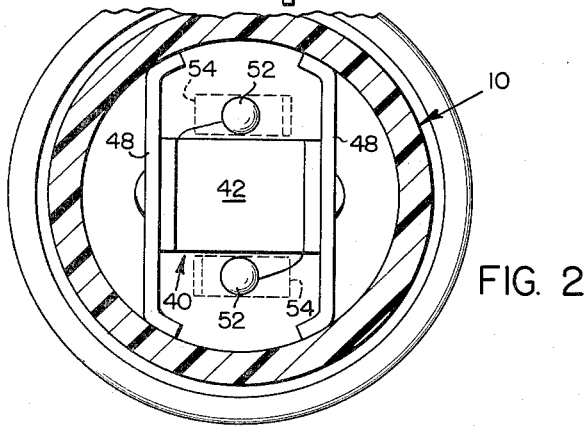
FIG. 2 is a fragmentary cross-sectional view of this indicator taken along the line 2—2 of FIG. 1.

The device is shown in FIG. 4 in an intermediate position such as would occur during movement of the rotatable disc 24. Mechanical interference between the two discs 12 and 24 serve as a stop to prevent over-driving of the rotatable disc 24 beyond the position indicated in FIG. 5.

The number of blades in each disc is not critical in the practice of the invention, but may be varied according to the designer's choice. Each disc should have at least two blades, and the blades should be sufficiently wide so that when taken together they occupy approximately the entire circle of the disc.

The sheet material of which the discs are made is preferably selected to be as thin as possible within the practical limits set by the requirements for support and reasonable rigidity. By making the blades relatively thin, substantially complete overlapping may be achieved in both extreme indicating positions of the indicator. However, the trailing edges of the blades 28 may be colored a neutral color to avoid any error in reading the indicator.

For indicating various conditions, separate indicators will be employed. Thus one indicator made according to this invention may be provided for indicating temperature, another for indicating fuel level, another for indicating oil pressure, another for indicating generator charging, etc. These indicators are all compact and occupy but relatively little space. Hence, an instrument panel can be made with these indicators which will be much more compact than where conventional gauges are employed.

The indicator of the invention will not only indicate trouble with a particular condition itself but will also warn when things are wrong in the electrical circuit itself, something that conventional liquid level, temperature, and oil pressure gauges, and ammeters when coupled with warning lights, do not do. If anything goes wrong with the electrical circuit of a condition-responsive device where the indicator of the present invention is being used, the electromagnet 40 will be deenergized; and the return magnet 38 will cause the indicator to show red. This indicator, moreover, is rugged and dependable in service, not subject to burn-out, nor to damage due to vibration. It has relatively small power and low heat dissipation requirements, and may be continuously operated for long periods of time, and is, therefore, well suited for use as a normally energized, fail-safe warning device. It is relatively simple and inexpensive to manufacture and to assemble, and extremely compact relative to the size of the display it provides.

Having thus described my invention, what I claim is:
1. An indicator comprising
   (a) a pair of coaxially mounted discs,
   (b) said discs being composed of similarly shaped radially extending blades which are angularly inclined to a plane perpendicular to the common axis of said discs, and
   (c) means for producing relative rotation in one direction between said discs in response to a selected signal, said blades of each disc being spaced in approximately coincident planes relative to each other, whereby the blades of one disc appear in front of the blades of the other disc and
   (d) means for producing relative rotation of said one disc in the other direction upon discontinuance of said signal so that the blades of said one disc will then be behind the blades of said other disc.
2. An indicator comprising
   (a) a pair of coaxially mounted discs,
   (b) said discs being composed of similarly shaped radially extending blades which are angularly inclined to a plane perpendicular to the common axis of said disc,
   (c) a permanent magnet fixed relative to one of said discs coaxially therewith and polarized parallel to said plane,
   (d) means mounting said one disc and said permanent magnet for joint rotation relative to the other of said discs,
   (e) a magnetic member fixed relative to said other disc for urging said permanent magnet and said one disc toward a selected angular position relative to said other disc, and
   (f) an electromagnet for driving said permanent magnet and said first disc away from said selected angular position in response to an applied electrical signal.
3. An indicator comprising

(a) a housing having a transparent portion extending over and closing one end thereof,
(b) a pair of mutually differently colored discs mounted coaxially in said housing adjacent to said one end thereof for limited rotation relative to each other,
(c) each one of said discs being composed of similarly shaped blades which are angularly inclined to a plane perpendicular to the common axis of said discs, said discs being arranged with their major planes approximately coincident,
(d) one of said discs being fixed relative to said housing,
(e) the other one thereof being rotatable,
(f) permanent magnet means for biasing said other disc toward a first selected angular position relative to said one disc, and
(g) electromagnetic means for rotating said other disc toward a second angular position in response to an applied electrical signal.

4. An indicator comprising
(a) a cylindrical housing having a transparent portion extending over and closing one end thereof,
(b) a pair of mutually differently colored discs mounted coaxially in said housing adjacent to said one end thereof for limited rotation relative to each other,
(c) each one of said discs being composed of similarly shaped blades which are angularly inclined to a plane perpendicular to the common axis of said discs,
(d) means mounting one of said discs by its peripheral edge in fixed position relative to said housing and with its blades facing said transparent portion of said housing,
(e) a pivot fixed in said housing coaxially with said common axis,
(f) means mounting the other one of said discs on said pivot with the major plane of said other disc approximately coincident with the major plane of said one disc,
(g) a permanent magnet fixed relative to said other disc for rotation therewith, said magnet being polarized diametrically relative to its axis of rotation,
(h) a magnetic biasing member fixed relative to said housing for biasing said permanent magnet together with said other disc toward a preselected angular position in which the blades of said other disc lie on one side of the blades of said one disc, and
(i) an electromagnet positioned in said housing for driving said permanent magnet and said other disc toward another angular position wherein its blades lie on the opposite sides of the blades of said one disc.

References Cited by the Examiner
UNITED STATES PATENTS

| | | | |
|---|---|---|---|
| 2,367,299 | 1/45 | McLarn et al. | 340—373 |
| 3,036,300 | 5/62 | Knight | 340—373 |

OTHER REFERENCES

Publication, I.B.M., vol. 1, No. 2, August 1958.

NEIL C. READ, *Primary Examiner.*